March 29, 1966 J. M. S. KEEN 3,242,672
INTAKE COVER FOR A GAS TURBINE ENGINE
Filed June 19, 1963 2 Sheets-Sheet 1

United States Patent Office 3,242,672
Patented Mar. 29, 1966

3,242,672
INTAKE COVER FOR A GAS TURBINE ENGINE
John Michael Storer Keen, Allestree, Derby, England, assignor to Rolls-Royce Limited, Derby, England, a company of Great Britain
Filed June 19, 1963, Ser. No. 288,968
Claims priority, application Great Britain, June 28, 1962, 24,957/62
7 Claims. (Cl. 60—39.09)

This invention concerns an intake cover for a gas turbine engine.

According to the present invention, there is provided an intake cover for a gas turbine engine comprising a substantialy conical member which is adapted to close the upstream end of the air intake of a gas turbine engine, the said substantially conical member being provided at its apex with means engageable by lifting tackle, and the said substantially conical member being provided with a plurality of angularly spaced apart clamps by means of which the base of the said substantially conical member may be clamped to the lip at the said upstream end of the air intake.

It will be appreciated that the intake cover of the present invention, when secured in position on a gas turbine engine, will not only prevent the ingress of foreign bodies into the air intake but will also make it easier to lift the engine in the course of the installation of the latter in an aircraft.

Preferably the said means engageable by lifting tackle comprises a ring.

Each clamp may be constituted by a substantially G-shaped clamp which is attached to the substantially conical member by a chain.

The substantially conical member may, moreover, be provided adjacent its base with a plurality of angularly spaced apart blocks, each block being adapted to be engaged by a said G-shaped clamp.

The invention also comprises a gas turbine engine to the lip at the upstream end of whose air intake is clamped a cover as set forth above.

The said engine may be a vertical lift engine, i.e., an engine adapted to produce vertical lift forces on an aircraft independently of those generated aerodynamically by forward flight thereof. The said engine may, moreover, be a so-called "plastic engine" i.e., an engine of lightweight construction having an engine casing and a compressor made at least mainly of synthetic resin material.

Figure 1:
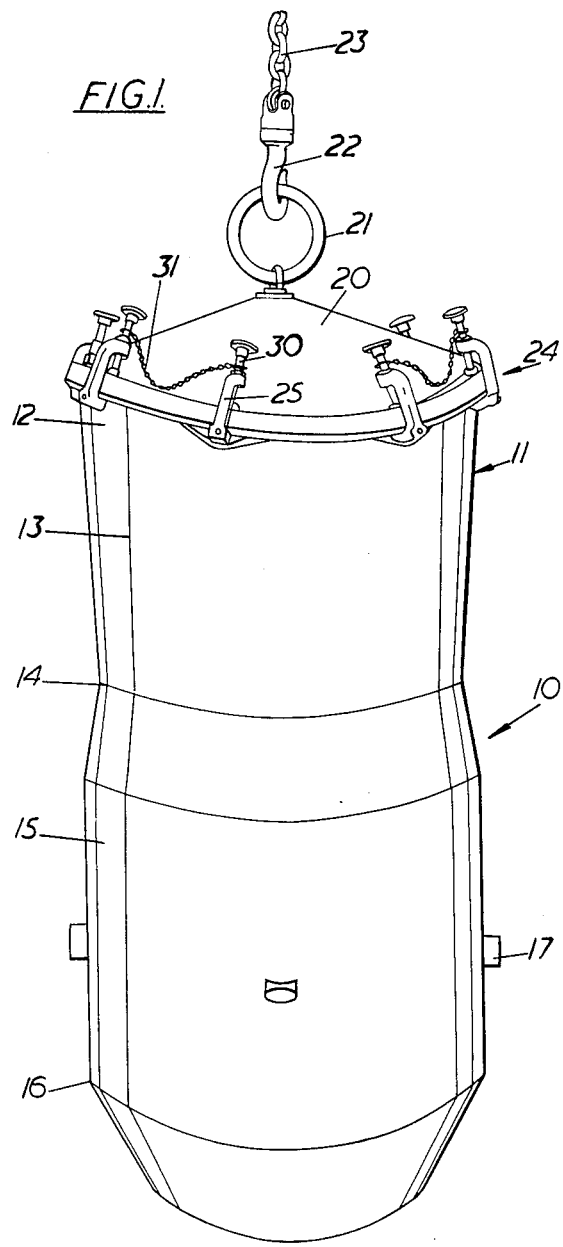
Figure 2:
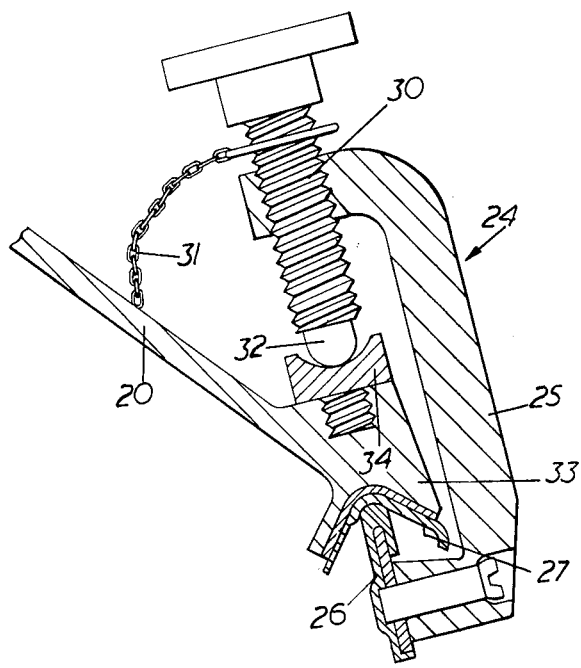

The invention is illustrated, merely by way of example, in the accompanying drawings, in which:

FIGURE 1 is a diagrammatic elevation of a vertical lift gas turbine engine provided with an intake cover according to the present invention, and FIGURE 2 is a section showing part of the structure illustrated in FIGURE 1.

Referring to the drawings, a vertical lift gas turbine engine 10 of lightweight construction for an aircraft (not shown) comprises an engine casing 11 of synthetic resin material. Within the engine casing 11 there are arranged in flow series an air intake 12, a compressor 13 which is made at least mainly of synthetic resin material, combustion equipment 14, and a turbine 15, the turbine exhaust gases being directed to atmosphere through a jet pipe 16.

The engine 10 has trunnion mountings 17 by means of which the engine 10 may be mounted in the aircraft.

The upstream end of the air intake 12 is closed by a substantially conical cover member 20 to whose apex is secured a ring 21. The ring 21 is engageable by a hook 22 of lifting tackle 23 by means of which the engine 10 may be lifted in the course of its installation in the aircraft.

The cover member 20 is provided with a plurality of angularly spaced apart G-shaped clamps 24. Each clamp 24 has a frame 25 which is provided at one end with a disc 26, the disc 26 being engageable with the lip 27 at the upstream end of the air intake 12. Threaded through each frame 25 is a clamp member 30 which is connected to the cover member 20 by a chain 31.

Each clamp member 30 has a rounded end portion 32. The cover member 20 is provided adjacent to its base 33 with a plurality of angularly spaced blocks 34, one for each of the clamps 24. Each block 34 is adapted to be engaged by the end portion 32 of the respective clamp member 30.

The clamps 24 thus serve to clamp the cover member 20 to the lip 27.

By reason of its vertical disposition, there is a more than usual danger that spanners and other foreign bodies will be dropped into the intake of a vertical lift engine in the course of installing the engine in an aircraft. The cover member 20 will prevent this from occurring, while the ease with which the ring 21 may be engaged by the hook 22 will simplify the installation of the engine 10 in an aircraft.

I claim:

1. An intake cover for a gas turbine engine comprising a substantially conical member which is adapted to close the upstream end of the air intake of a gas turbine engine, said air intake having a lip at its upstream end, means which are engageable by lifting tackle and which are mounted at the apex of the said substantially conical member, and a plurality of angularly spaced apart clamps which are secured to the base of the said substantially conical member and which may be clamped to the lip at the said upstream end of the air intake.

2. An intake cover for a gas turbine engine comprising a substantially conical member which is adapted to close the upstream end of the air intake of a gas turbine engine, said air intake having a lip at its upstream end, a ring mounted at the apex of the said substantially conical member, and a plurality of angularly spaced apart clamps which are secured to the base of the said substantially conical member and which may be clamped to the lip at the said upstream end of the air intake.

3. In combination, a gas turbine engine and an intake cover therefor comprising a substantially conical member which closes the upstream end of the air intake of the gas turbine engine, said air intake having a lip at its upstream end, means which are engageable by lifting tackle and which are mounted at the apex of the said substantially conical member, and a plurality of angularly spaced apart clamps which are secured to the base of the said substantially conical member and to the lip at the said upstream end of the air intake.

4. A gas turbine engine as claimed in claim 3 in which the engine is a vertical lift engine.

5. A gas turbine engine as claimed in claim 3 in which the engine has an engine casing and a compressor made at least mainly of synthetic resin material.

6. For use with a gas turbine engine having an air intake defined by a lip, combined load bearing and cover means adapted to be detachably secured to the lip of the intake of the engine and adapted to be engaged by lifting tackle during installation of the engine and to cover the intake of the engine against the ingress of foreign matter into the engine comprising a cover element capable of supporting the engine during the installation operation, and detachable clamping means on the cover element adapted to engage the lip of the intake of the engine to secure the cover element to the engine so that the intake of the engine is covered and the engine can be lifted into its installed position through the cover element.

7. Combined load bearing and cover means as claimed in claim 6 wherein said clamping means is carried solely by the cover element and is removable from the engine together with the cover element after the engine has been installed.

References Cited by the Examiner
UNITED STATES PATENTS

| | | | |
|---|---|---|---|
| 909,222 | 1/1909 | Reynolds | 294—67 |
| 1,450,687 | 4/1923 | Kunin. | |
| 1,769,696 | 7/1930 | Kocher. | |
| 2,744,382 | 5/1956 | Sokol et al. | 60—39.09 |
| 2,913,275 | 11/1959 | La Rocca | 294—103 X |
| 2,984,513 | 5/1961 | Nearman | 294—67 |
| 2,995,294 | 8/1961 | Warnken | 253—77 X |
| 3,043,538 | 7/1962 | Taylor | 244—53 X |
| 3,098,632 | 7/1963 | Christenson | 60—35.6 |

MARK NEWMAN, *Primary Examiner.*

SAMUEL LEVINE, *Examiner.*

D. HART, *Assistant Examiner.*